(12) United States Patent
Griswold

(10) Patent No.: US 10,807,572 B1
(45) Date of Patent: Oct. 20, 2020

(54) CHOCK DEVICE

(71) Applicant: HD Mobile Repair, LLC, Camano, WA (US)

(72) Inventor: Joey Griswold, Camano, WA (US)

( * ) Notice: Subject to any disclaimer, the term of this patent is extended or adjusted under 35 U.S.C. 154(b) by 0 days.

(21) Appl. No.: 16/282,818

(22) Filed: Feb. 22, 2019

(51) Int. Cl.
*B60T 3/00* (2006.01)

(52) U.S. Cl.
CPC ..................... *B60T 3/00* (2013.01)

(58) Field of Classification Search
CPC ............... B60T 3/00; B60P 3/077; B64F 1/16
USPC .......................................... 188/32; D12/217
See application file for complete search history.

(56) References Cited

U.S. PATENT DOCUMENTS

| | | | |
|---|---|---|---|
| D57,774 S * | 5/1921 | Francis | |
| 1,893,580 A * | 1/1933 | Colley | B60T 3/00 188/32 |
| D180,922 S * | 9/1957 | Zikmund et al. | D12/217 |
| 3,189,127 A * | 6/1965 | Karnow | B64F 1/16 188/32 |
| D235,332 S * | 6/1975 | Richilano | D12/217 |
| 3,993,167 A | 11/1976 | Reed | |
| 4,641,994 A * | 2/1987 | Hankison | E01F 9/588 188/32 |
| 4,871,291 A * | 10/1989 | Moore | B60P 3/125 414/563 |
| 4,911,270 A | 3/1990 | Hudson | |
| 4,917,219 A * | 4/1990 | Henry | B60T 3/00 188/32 |
| D524,222 S * | 7/2006 | Chrisco | D12/217 |
| 2015/0144436 A1* | 5/2015 | Bonk | B64F 1/16 188/32 |
| 2018/0094445 A1* | 4/2018 | Beursken | B64C 25/001 |

* cited by examiner

*Primary Examiner* — Melanie Torres Williams
(74) *Attorney, Agent, or Firm* — Sanchelima & Associates, P.A.; Christian Sanchelima; Jesus Sanchelima

(57) ABSTRACT

The present invention relates to a chock device comprising a pair of chock bodies, wherein the chock body has a triangular profile defined by a first side, a second side, and a third side, wherein the first side has a curved profile to receive and snugly fit with a tire of a vehicle thereon; the second side is a base of the chock body having a substantially flat surface; and the third side is an operative rear side of the chock body having a smoothened concave profile. The chock devices further comprises an adjustment rod disposed operatively between the pair of chock bodies to mechanically couple the pair of chock bodies, the adjustment rod having a telescopic configuration.

12 Claims, 4 Drawing Sheets

CHOCK DEVICE

BACKGROUND OF THE INVENTION

1. Field of the Invention

The present disclosure relates to the field of chocks. In particular, the present disclosure relates to a chock device designed for easily guiding a hose, cable or cord around the tire of a parked vehicle.

2. Description of the Related Art

Chocks are typically used for holding parked vehicles in a stationary position, while the vehicle is being worked upon. The operations being performed on the vehicle may require instruments with extensive wiring or pipes, which tend to get caught up between the chocks and the tires. This is not desired.

Several designs for chocks have been designed in the past. None of them, however, are known to be specifically designed to for accommodating a variety of tires of different widths, while at the same time preventing the wires or hoses getting caught up between the chock and the tire while the vehicle is being worked upon.

Applicant believes that a related reference corresponds to U.S. Pat. No. 3,993,167 filed by WESLEY BRAM REED. The Reed reference discloses a wheel chock for use in restraining movement of a stationary vehicle, wherein the wheel chock comprises a solid body of resiliently flexible material, preferably rubber. However, the Reed reference fails to disclose a chock configured for accommodating a variety of tires of different widths, while at the same time preventing the wires or hoses getting caught up between the chock and the tire while the vehicle is being worked upon.

Another related application is U.S. Pat. No. 4,911,270 filed by TIMOTHY S. HUDSON. The Hudson reference discloses a chock for preventing the rolling movement of a vehicle wheel is provided. The chock comprises a body having an upstanding humped portion having opposing forwardly and rearwardly sloping surfaces for the passage of a wheel of a vehicle therealong. However, the Hudson reference fails to disclose a chock configured for accommodating a variety of tires of different widths, while at the same time preventing the wires or hoses getting caught up between the chock and the tire while the vehicle is being worked upon.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a chock device that is configured to accommodate tires of different widths thereon.

It is yet another object of the present invention to provide a chock device that prevents the wires or hoses from getting caught up between the chock and the tire while the vehicle is being worked upon.

Further objects of the invention will be brought out in the following part of the specification, wherein detailed description is for the purpose of fully disclosing the invention without placing any limitations thereon.

BRIEF DESCRIPTION OF THE DRAWING

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
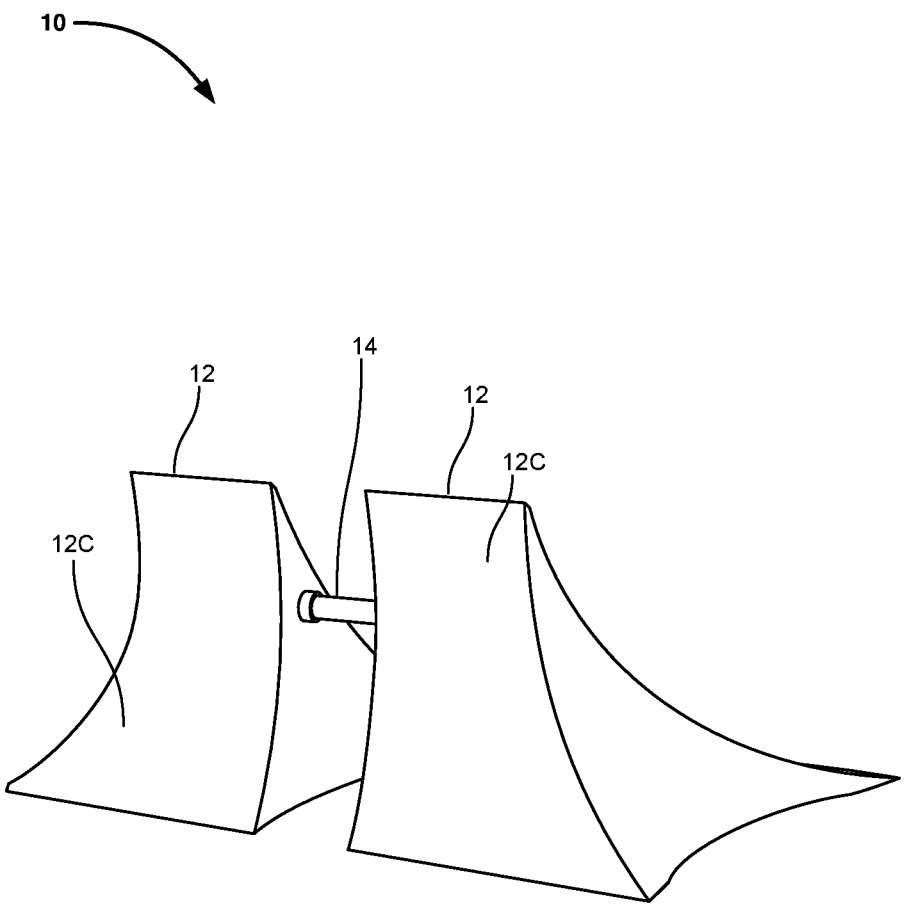
FIG. 1 illustrates an isometric view a chock device 10, in accordance with an embodiment of the present invention, wherein the chock device 10 comprises a pair of chock bodies 12 that are mechanically coupled via an adjustment rod 14, wherein the adjustment rod 14 has a telescopic configuration, which facilitates the variation of the distance between the chuck bodies 12.
Figure 2:
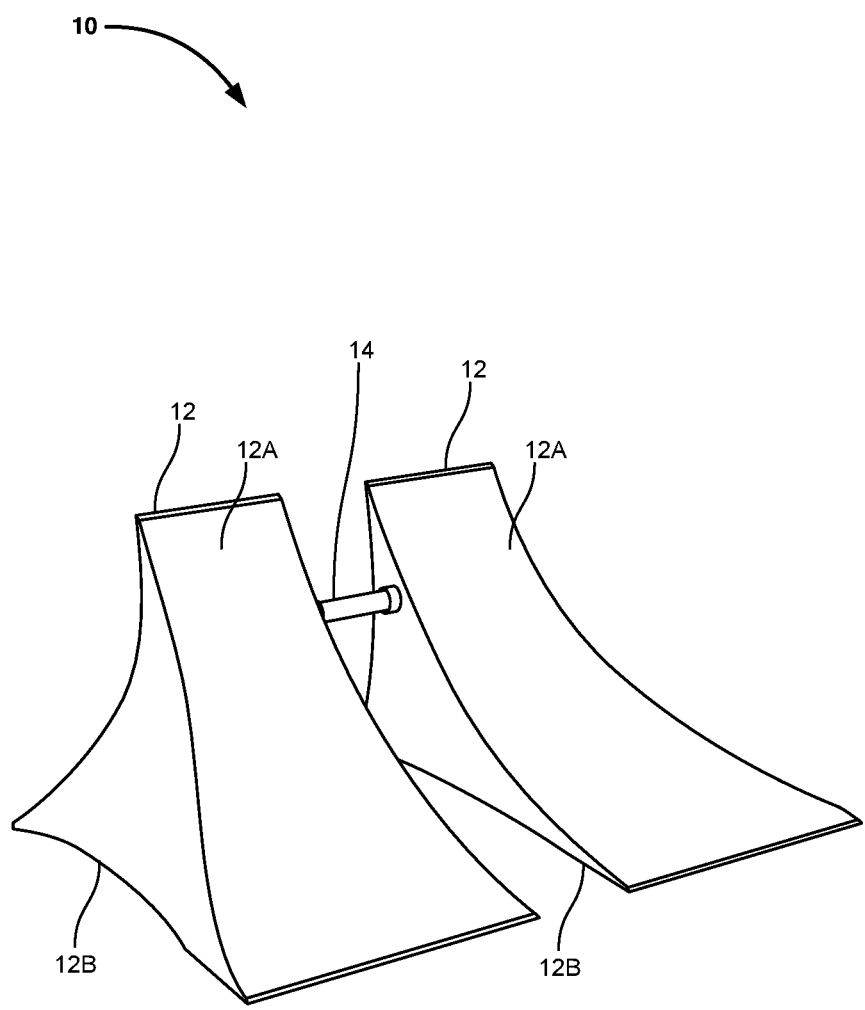
FIG. 2 illustrates another isometric view the chock device 10, in accordance with an embodiment of the present invention, in which a first side 12A of the chock body 12 is seen.
Figure 3:
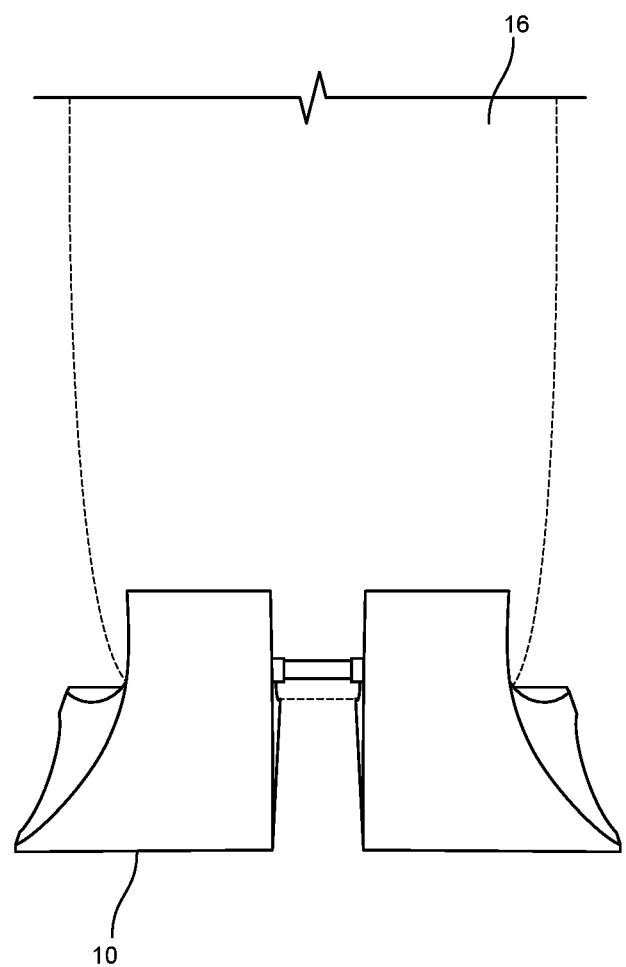
FIG. 3 illustrates a front view of a tire 16 supported on the chock device 10, in accordance with an embodiment of the present invention.
Figure 4:
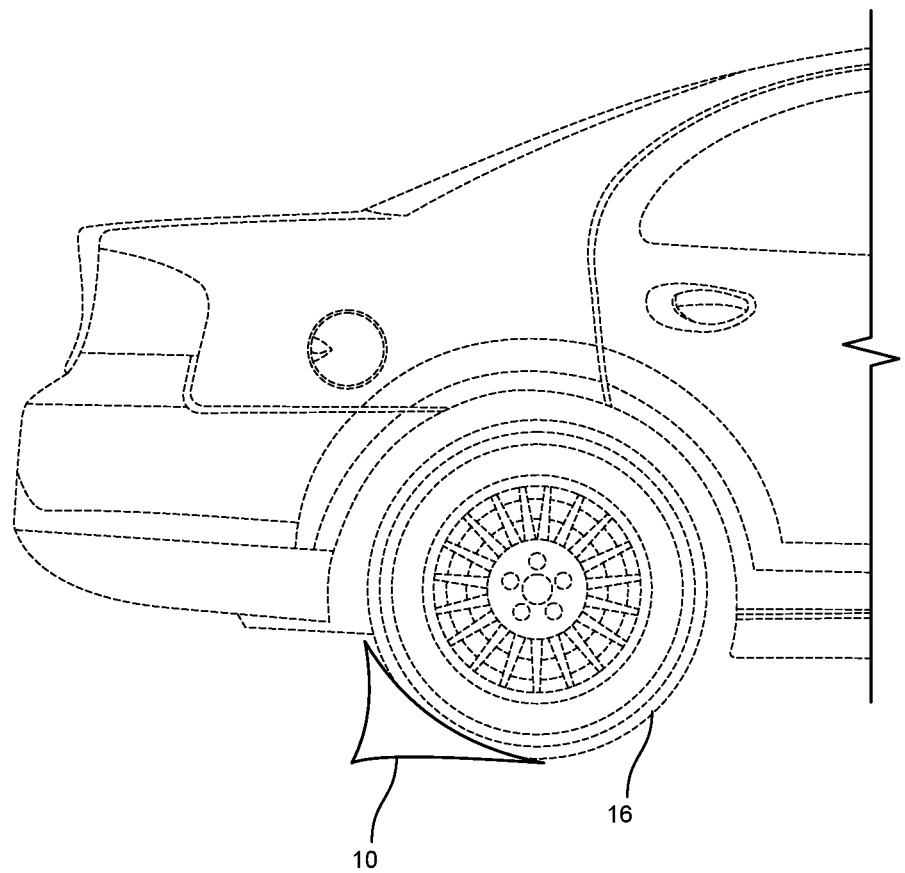
FIG. 4 illustrates a side view of the tire 16 supported on the chock device 10, in accordance with an embodiment of the present invention.

Referring now to FIG. 1 thru FIG. 4, where the present invention is generally referred to with numeral 10, it can be observed that a chock device 10 (hereinafter referred to as chock 10), in accordance with an embodiment of the present invention, comprises a pair of chock bodies 12 that are mechanically coupled via an adjustment rod 14.

The chock body 12, in accordance with an embodiment of the present invention, has a triangular profile. The triangular profile is defined by a first side 12A, a second side 12B, and a third side 12C. The first side 12A has a curved profile to receive and snugly fit with a tire 16 of a vehicle thereon. More specifically, the purpose of a chock is to receive a tire of a vehicle thereon and to prevent the movement of the vehicle by blocking the movement of the tire. To this end, the first side 12A, which receives the tire 16 thereon, has a curved profile that complements the curvature of the tire 16. Such a configuration of the first side allows the chock body 12 to snugly fit to the tire 16.

The second side 12B, of the chock body 12, is a base of the chock body 12. The base of the chock body 12 has a substantially flat configuration. The flat configuration is provided to the base so that the base can adhere to the ground to prevent the motion of the tire 16 supported thereon. In one embodiment, to further strengthen the adherence to the chock body 12 to the ground, the second side 12B can be provided with a non-slip surface. In one embodiment, the non-slip surface can be of rubber.

The third side 12C, of the chock body 12, is an operative rear side of the chock body 12 having a smoothened concave profile. The smoothened concave profile of the third side 12C of the chock body 12 facilitates a hose, a cord, or any kind of line to be easily pulled around the tire instead of getting trapped and pinched underneath the tread.

In accordance with an embodiment of the present invention, the chock device 10 comprises the pair of chock bodies 12. More specifically, the pair of chock bodies 12 are arranged in a spaced-apart configuration. In the spaced apart configuration, the chock bodies 12 are coupled via the adjustment rod 14. In accordance with one embodiment, the adjustment rod 14 has a telescopic configuration. The telescopic configuration of the adjustment rod 14 facilitates variation in distance between the pair of chock bodies 12.

In accordance with the present invention, the chock device 10 is made of high strength plastic. In accordance with one embodiment, the chock body 12 has a height of 6 inches, a length of 8 to 10 inches, and a width of 8 to 10 inches.

As such, the chock device 10, as disclosed in the present disclosure, can be used to stop the rolling of a variety of vehicles ranging from a car, a pickup truck, a truck, a tractor, and the like. Furthermore, the chock device 10 securely holds the vehicle in place so that it does not move while the vehicle is being worked upon. The chock device 10 also prevents hoses and cords from snagging on tires, thereby eliminating the need to untangle hoses and cords repeatedly.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A chock device comprising:
   a. a pair of chock bodies, said pair of chock bodies being adjacent to each other and arranged in a spaced apart configuration, wherein each of the pair of chock bodies have a triangular profile, each of the pair of chock bodies are defined by a front side, a rear side, a bottom side, an inner side and an outer side, said front side being curved and sloped to receive and snugly fit with a tire of a vehicle, said front side being substantially in constant abutting contact with said tire, said rear side having a smoothened concave shape that extends outwardly and away from each of said pair of chock bodies, said bottom side being substantially flat and in contact with a ground surface, said inner side being flat, said outer side being curved and sloped, said outer side flaring outwardly and away from each of said pair of chock bodies, said pair of chock bodies both being simultaneously in constant abutting contact with the same said tire.

2. The device according to claim 1, wherein the pair of chock bodies are coupled to each other via an adjustment rod extending therebetween.

3. The device according to claim 2, wherein the adjustment rod has a telescopic configuration, thereby facilitating variation in distance between the pair of chock bodies.

4. The device according to claim 3, wherein the chock device is made of plastic.

5. The device according to claim 1, wherein the bottom side includes a non-slip surface.

6. The device according to claim 5, wherein the non-slip surface is made of rubber.

7. The device according to claim 2, wherein said adjustment rod is mounted to an upper portion of said inner side of each of said pair of chock bodies.

8. The device according to claim 1, wherein said outer side includes an outer side bottom edge that is curved.

9. The device according to claim 1, wherein said front side, said rear side, said inner side and said outer side are tapered.

10. The device according to claim 2, wherein said adjustable rod includes two distal ends, said distal ends being wider than said adjustable rod.

11. The device according to claim 1, wherein said front side includes a top edge and a bottom edge, said bottom edge having a length greater than said bottom side.

12. The device according to claim 1, wherein each of said pair of chock bodies includes three concave sides, said concave sides adapted to prevent hoses and cords from snagging on said tire or said pair of chock bodies.

* * * * *